(12) United States Patent
Wu et al.

(10) Patent No.: US 9,478,854 B2
(45) Date of Patent: Oct. 25, 2016

(54) DEVICES AND METHODS FOR REDUCING INTERFERENCE BETWEEN CLOSELY COLLOCATED ANTENNAS

(71) Applicant: The Chinese University of Hong Kong, Hong Kong (CN)

(72) Inventors: Ke-Li Wu, Hong Kong (CN); Luyu Zhao, Shaanxi (CN); Kewei Qian, Sichuan (CN); Dacheng Wei, Guangzhou (CN)

(73) Assignee: The Chinese University of Hong Kong, Hong Kong (CN)

( * ) Notice: Subject to any disclaimer, the term of this patent is extended or adjusted under 35 U.S.C. 154(b) by 123 days.

(21) Appl. No.: 14/215,435

(22) Filed: Mar. 17, 2014

(65) Prior Publication Data

US 2015/0263420 A1 Sep. 17, 2015

(51) Int. Cl.
| | | |
|---|---|---|
| *H01Q 1/52* | (2006.01) | |
| *H04B 1/52* | (2015.01) | |
| *H01P 1/213* | (2006.01) | |
| *H01P 1/205* | (2006.01) | |
| *H04B 1/525* | (2015.01) | |

(52) U.S. Cl.
CPC ............ *H01Q 1/523* (2013.01); *H01P 1/2136* (2013.01); *H01Q 1/521* (2013.01); *H04B 1/525* (2013.01); *H01P 1/2053* (2013.01)

(58) Field of Classification Search
CPC ........ H01Q 1/523; H01Q 1/521; H01Q 1/52; H01Q 1/525; H01P 1/2053; H01P 1/2136; H03H 7/468; H04B 1/44; H04B 1/525
See application file for complete search history.

(56) References Cited

U.S. PATENT DOCUMENTS

| | | | | |
|---|---|---|---|---|
| 7,693,551 | B2 * | 4/2010 | Ojard ................. | H01Q 21/00 375/259 |
| 8,073,486 | B2 * | 12/2011 | Mundarath ............ | H04B 7/043 370/334 |
| 2009/0245146 | A1 * | 10/2009 | Gummalla ........... | H01Q 1/2283 370/281 |
| 2012/0217818 | A1 * | 8/2012 | Yerazunis ............... | H02J 5/005 307/104 |

(Continued)

OTHER PUBLICATIONS

3rd Generation Partnership Project: Technical Specification Group Radio Access Network; Evolved Universal Terrestrial Radio Access (E-UTRA); Study on signaling and procedure for interface avoidance for in-device coexistence (Release 11) 3GPP TR 36.816 V11.2.0 (44 pages) (Dec. 2011).

(Continued)

*Primary Examiner* — Lewis West
(74) *Attorney, Agent, or Firm* — Seed IP Law Group PLLC

(57) ABSTRACT

Devices and methods for reducing interference between closely collocated antennas working at the same or adjacent frequencies are disclosed. According to one embodiment, the antenna array comprises a plurality of antennas for transmitting signals from and receiving signals to a plurality of transceivers respectively, and the device comprises a plurality of resonators; a first set of ports, each of which is connected to a respective one of the plurality of transceivers; and a second set of ports, each of which is connected to a respective one of the plurality of antennas; wherein each of the transceivers and the antennas is connected to a respective one of the resonators, and coupling coefficients among the resonators as well as a resonance frequency of each of the resonators are configured so that a desired isolation among the first set of ports and a desired matching at each of the first set of ports are obtained.

8 Claims, 7 Drawing Sheets

(56) References Cited

U.S. PATENT DOCUMENTS

| | | | | |
|---|---|---|---|---|
| 2013/0328582 | A1* | 12/2013 | Han | H01Q 9/0442 324/750.02 |
| 2014/0152523 | A1* | 6/2014 | Wu | H01Q 1/523 343/841 |

OTHER PUBLICATIONS

Agilent EEsof EDA "Advanced Design System," Agilent Technologies (16 pages) (Apr. 1, 2014).
Agilent EEsof EDA EMPro "3D Electromagnetic Modeling and Simulation Environment Integrated with your ADS Design Flow," Agilent Technologies (8 pages) (Aug. 22, 2013).
Bandler et al., "Space Mapping: The State of the Art," *IEEE Transactions on Microwave Theory and Techniques* 52(1):337-361 (Jan. 2004).
Chiu et al., "Reduction of Mutual Coupling Between Closely-Packed Antenna Elements," *IEEE Transactions on Antennas and Propagation* 55(6):1732-1738 (Jun. 2007).
Choi et al., "Achieving Single Channel, Full Duplex Wireless Communication," *Stanford University* (12 pages) (2010).
Egan, "Practical RF System Design," *IEEE—Wiley-Interscience* New York (13 pages) (2003).
ETSI TS 136 104, LTE; Evolved Universal Terrestrial Radio Access (E-UTRA); Base Station (BS) radio transmission and reception (3GPP TS 36.104 version 10.2.0 Release 10) (103 Pages) (May 2011).
García-Lampérez et al., "Analytical synthesis of microwave multiport networks," *IEEE MTT-S Digest* pp. 455-458 (2004).
Habibi et al., "Experimental Evaluation of an Adaptive Nonlinear Interference Suppressor for Multimode Transceivers," *IEEE Journal on Emerging and Selected Topics in Circuits and Systems* 3(4):602-614 (Dec. 2013).
Hu et al., "Interference Avoidance for In-Device Coexistence in 3GPP LTE-Advanced: Challenges and Solutions," *IEEE Communications Magazine* pp. 60-67 (Nov. 2012).
Hu et al., "A $TM_{11}$ Dual-Mode Dielectric Resonator Filter With Planar Coupling Configuration," *IEEE Transactions on Microwave Theory and Techniques* 61(1):131-138 (Jan. 2013).
Hu et al., "A Deterministic EM Design Technique for General Waveguide Dual-Mode Bandpass Filters," *IEEE Transactions on Microwave Theory and Techniques* 61(2):800-807 (Feb. 2013).
Hu et al., "Stepped Circular Waveguide Dual-Mode Filters for Broadband Contiguous Multiplexers," *IEEE Transactions on Microwave Theory and Techniques* 61(1):139-145 (Jan. 2013).
Konanur et al., "Increasing Wireless Channel Capacity Through MIMO Systems Employing Co-Located Antennas," *IEEE Transactions on Microwave Theory and Techniques* 53(6):1837-1844 (Jun. 2005).
López-Pérez et al, "Enhanced Intercell Interference Coordination Challenges in Heterogeneous Networks," *IEEE Wireless Communications* pp. 22-30 (Jun. 2011).
Macchiarella et al., "Novel Approach to the Synthesis of Microwave Diplexers," *IEEE Transactions on Microwave Theory and Techniques* 54(12):4281-4290 (Dec. 2006).
Meng et al., "Direct Optimal Synthesis of a Microwave Bandpass Filter With General Loading Effect," *IEEE Transactions on Microwave Theory and Techniques* 61(7):2566-2573 (Jul. 2013).
Raghavan et al., "Analysis and Design of an Interference Canceller for Collocated Radios," *IEEE Transactions on Microwave Theory and Techniques* 53(11):3498-3508 (Nov. 2005).
Rosenberg et al., "New Power Distribution (Combination) Method with Frequency Selective Properties," $42^{nd}$ European Microwave Conference, RAI Amsterdam (34 pages) (Oct. 28-Nov. 2, 2012).
Skaik et al., "Synthesis of multiple output coupled resonator circuits using coupling matrix optimisation," *IET Microwaves, Antennas & Propagation* 5(9):1081-1088 (2011).
Volmer et al., "An Eigen-Analysis of Compact Antenna Arrays and Its Application to Port Decoupling," *IEEE Transactions on Antennas and Propagation* 56(2):360-370 (Feb. 2008).
Yang et al., "Microstrip Antennas Integrated With Electromagnetic Band-Gap (EBG) Structures: A Low Mutual Coupling Design for Array Applications," *IEEE Transactions on Antennas and Propagation* 51(10):2936-2946 (Oct. 2003).
Yeung et al., "Mode-Based Beamforming Arrays for Miniaturized Platforms," *IEEE Transactions on Microwave Theory and Techniques* 57(1):45-52 (Jan. 2009).
Yeung et al., "PEEC Modeling of Radiation Problems for Microstrip Structures," *IEEE Transactions on Antennas and Propagation* 61(7):3648-3655 (Jul. 2013).

\* cited by examiner

- ▲ Isolation between antennas
- △ Isolation with CRDN only
- ■ Isolation with filter only
- □ Isolation with filter and CRDN Freq (GHz)

DEVICES AND METHODS FOR REDUCING INTERFERENCE BETWEEN CLOSELY COLLOCATED ANTENNAS

TECHNICAL FILED

The present application relates to an antenna decoupling technology, in particular, to devices and methods for reducing interference between closely collocated antennas working at the same or adjacent frequencies.

BACKGROUND

There is an irreversible trend in today's wireless communication systems that more and more communication systems of different protocols and various working frequencies are integrated into one increasingly compact physical unit. Such trend impacts not only mobile terminals but also network infrastructure equipment such as base stations and wireless routers. In a mobile unit, such as a mobile phone or a laptop computer, multiple wireless services, including GSM, UMTS, Wi-Fi, LTE, GPS and Bluetooth, coexist in a very compact space. The radio frequency interference among the systems that operate at the same or adjacent frequency bands can seriously affect the quality of service. Meanwhile, in a today's wireless base station, antennas for 2G (GSM), 3G (UMTS), 4G (LTE) as well as Wi-Fi wireless communication systems must coexist in a close vicinity, which inevitably create radio frequency interference to each other through antennas since these frequency bands are very close to each other.

Although there are many preliminary attempts from industry and academic communities to avoid such interference by adding filters and increasing spatial isolation between two antennas as far as possible, the interference among the systems operating at adjacent frequencies cannot be sufficiently suppressed if the spatial isolation is not sufficient. The coexistence interference issue among radio transceivers and antennas becomes increasingly important as the size of an integrated system decreasing and the number of wireless systems increasing.

Current solutions for reducing the interference can be divided into three categories: signaling-based solutions that require coordination between the collated transceivers, active interference suppression solutions that need complex active circuitry and control algorithm, and antenna isolation enhancement solutions by passive networks. However, none of them works for two radio systems working in two adjacent frequency bands.

SUMMARY OF INVENTION

According to an aspect of the present application, a device for reducing interference between antennas in a compact antenna array is proposed. According to an embodiment, the antenna array comprises a plurality of antennas for transmitting signals from and receiving signals to a plurality of transceivers respectively, and the device comprises a plurality of resonators; a first set of ports, each of which is connected to a respective one of the plurality of transceivers; and a second set of ports, each of which is connected to a respective one of the plurality of antennas; wherein each of the transceivers and the antennas is connected to a respective one of the resonators, and coupling coefficients among the resonators as well as a resonance frequency of each of the resonators are configured so that a desired isolation among the first set of ports and a desired matching at each of the first set of ports are obtained.

In an embodiment, the antenna array comprises a first antenna and a second antenna for transmitting signals from and receiving signals to a first transceiver and a second transceiver respectively, the first set of ports comprise a first port connected to the first transceiver and a second port connected to the second transceiver, the second set of ports comprise a third port connected to the first antenna and a fourth port connected to the second antenna, and the plurality of resonators comprise at least four resonators including a first resonator connected to the first port, a second resonator connected to the second port, a third resonator connected to the third port, and a fourth resonator connected to the fourth port, each of the at least four resonators is coupled with at least one remaining resonator of the at least four resonators, and wherein coupling coefficients between the at least four resonators as well as a resonance frequency of each of the at least four resonators are configured so that a desired isolation between the first port and the second port and a desired matching of each of the first port and the second port are obtained.

In an embodiment, said at least four resonators are the first resonator, the second resonator, the third resonator and the fourth resonator, and at least some of a coupling coefficient between the first resonator and the second resonator, a coupling coefficient between the third resonator and the fourth resonator, a coupling coefficient between the first resonator and the third resonator, a coupling coefficient between the second resonator and the fourth resonator, and wherein a coupling coefficient between the first resonator and the first port, a coupling coefficient between the second resonator and the second port, a coupling coefficient between the third resonator and the third port, and a coupling coefficient between the fourth resonator and the fourth port as well as the resonance frequency of each of the at least four resonators are configured so that the desired isolation is obtained.

In an embodiment, said at least four resonators are the first resonator, the second resonator, the third resonator, the fourth resonator, a fifth resonator located between and coupled with the first resonator and the third resonator, and a sixth resonator located between and coupled with the second resonator and the fourth resonator, and wherein at least some of a coupling coefficient between the first resonator and the second resonator, a coupling coefficient between the third resonator and the fourth resonator, a coupling coefficient between the first resonator and the fifth resonator, a coupling coefficient between the second resonator and the sixth resonator, a coupling coefficient between the third resonator and the fifth resonator, a coupling coefficient between the fourth resonator and the sixth resonator, a coupling coefficient between the first resonator and the first port, a coupling coefficient between the second resonator and the second port, a coupling coefficient between the third resonator and the third port, and a coupling coefficient between the fourth resonator and the fourth port are configured so that the desired isolation and the desired matching are obtained.

In an embodiment, the antenna array comprises a first antenna, a second antenna and a third antenna for transmitting signals from and receiving signals to a first transceiver, a second transceiver and a third transceiver respectively, the first set of ports comprise a first port connected to the first transceiver, a second port connected to the second transceiver, and a third port connected to the third transceiver, the second set of ports comprise a fourth port connected to the first antenna, a fifth port connected to the second antenna, and a sixth port connected to the third antenna, and the plurality of resonators comprise at least six resonators including a first resonator connected to the first port, a second resonator connected to the second port, a third resonator connected to the third port, a fourth resonator connected to the fourth port, a fifth resonator connected to the fifth port, and a sixth resonator connected to the sixth port, each of the at least six resonators is coupled with at least one remaining resonator of the at least six resonators, wherein coupling coefficients among the at least six resonators as well as a resonance frequency of each of the at least six resonators are configured so that a desired isolation between the first port and the second port and a desired isolation between the second port and the third port and a desired matching at each of the first port, the second port and the third port are obtained.

In an embodiment, the plurality of antennas are implemented as a single antenna for transmitting signals from and receiving signals to a plurality of transceivers respectively, and the device further comprises a port combining module inserted between the single antenna and the second sets of ports, wherein the port combining unit having a first port connected to the single antenna and a plurality of ports each connected to a respective one of the second sets of ports, coupling coefficients among the resonators, a resonance frequency of each of the resonators, and parameters of the port combining module are configured so that a desired isolation among the first set of ports and a desired matching at each of the first set of ports are obtained.

In an embodiment, the port combining module is implemented by a non-resonate node or a T-junction.

According to another aspect of the present application, a method for reducing interference between antennas in a compact antenna array is proposed. According to an embodiment, the antenna array comprises a plurality of antennas for transmitting signals from and receiving signals to a plurality of transceivers respectively, and the method comprises forming a resonator network comprising a plurality of resonators, a first set of ports each of which is connected to a respective one of the plurality of transceivers, and a second set of ports each of which is connected to a respective one of the plurality of antennas, so that each of the transceivers and the antennas is connected to a respective one of the resonators; and setting coupling coefficients among the resonators as well as a resonance frequency of each of the resonators so that a desired isolation among the first set of ports and a desired matching at each of the first set of ports are obtained.

In an embodiment, the antenna array comprises a first antenna and a second antenna for transmitting signals from and receiving signals to a first transceiver and a second transceiver respectively, the first set of ports comprise a first port connected to the first transceiver and a second port connected to the second transceiver, the second set of ports comprise a third port connected to the first antenna and a fourth port connected to the second antenna, and the plurality of resonators comprise at least four resonators including a first resonator connected to the first port, a second resonator connected to the second port, a third resonator connected to the third port, and a fourth resonator connected to the fourth port, each of the at least four resonators is coupled with at least one remaining resonator of the at least four resonators, and the setting step comprises setting coupling coefficients between the at least four resonators as well as a resonance frequency of each of the at least four resonators so that a desired isolation between the first port and the second port and a desired matching of each of the first port and the second port are obtained.

In an embodiment, the antenna array comprises a first antenna, a second antenna and a third antenna for transmitting signals from and receiving signals to a first transceiver, a second transceiver and a third transceiver respectively, the first set of ports comprise a first port connected to the first transceiver, a second port connected to the second transceiver, and a third port connected to the third transceiver, the second set of ports comprise a fourth port connected to the first antenna, a fifth port connected to the second antenna, and a sixth port connected to the third antenna, and the plurality of resonators comprise at least six resonators including a first resonator connected to the first port, a second resonator connected to the second port, a third resonator connected to the third port, a fourth resonator connected to the fourth port, a fifth resonator connected to the fifth port, and a sixth resonator connected to the sixth port, each of the at least six resonators is coupled with at least one remaining resonator of the at least six resonators, and the setting step comprises setting coupling coefficients among the at least six resonators as well as a resonance frequency of each of the at least six resonators so that a desired isolation between the first port and the second port and a desired isolation between the second port and the third port and a desired matching at each of the first port, the second port and the third port are obtained.

In an embodiment, the plurality of antennas are implemented as a single antenna for transmitting signals from and receiving signals to a plurality of transceivers respectively, the method further comprises inserting a port combining module between the single antenna and the second sets of ports, wherein the port combining unit having a first port connected to the single antenna and a plurality of ports each connected to a respective one of the second sets of ports; wherein the setting step comprises setting coupling coefficients among the resonators, a resonance frequency of each of the resonators, and parameters of the port combining module so that a desired isolation among the first set of ports and a desired matching at each of the first set of ports are obtained.

In an embodiment, the port combining module is implemented by a non-resonate node or a T-junction.

DETAILED EMBODIMENTS OF THE INVENTION

Hereinafter, embodiments of the present application will be described with reference to the accompanying drawings.

Figure 1:
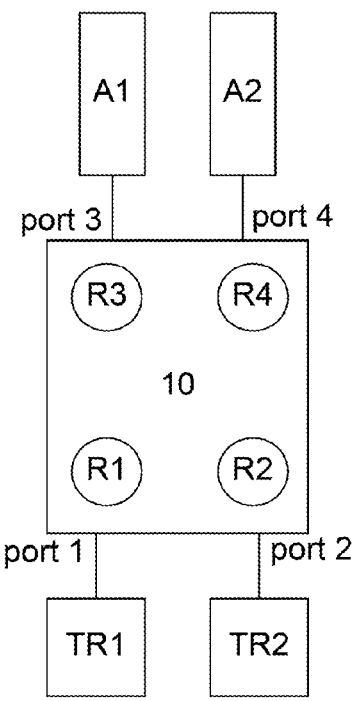
FIG. 1 is a block view of a system composed of two transceivers, two corresponding antennas, and a decoupling device according to an embodiment of the present application.

FIG. 1 is a block view of a system composed of two transceivers, two corresponding antennas, and a decoupling device according to an embodiment of the present application. As shown, two transceivers TR1 and TR2 are used for transmitting and receiving signals via two antennas A1 and A2 respectively. When the two antennas A1 and A2 are closely positioned, the interference therebetween is large. To reduce such interference, a device 10 with four ports (port 1, port 2, port 3, and port 4) accordingly is inserted between the antennas and the transceivers. The device 10 comprises at least four resonators R1, R2, R3 and R4 connected to port 1, port 2, port 3 and port 4, respectively. Each resonator of the at least four resonators is coupled with at least one remaining resonator of the at least four resonators, so that a resonator network is formed by the device 10. According to the present application, a set of coupling coefficients between resonators in the resonator network are configured so that a desired isolation between the two transceivers (port 1 and port 2) as well as desired matching condition at the two transceiver ports (port 1 and port 2) are satisfied. The coupling coefficients between resonators in the resonator network may be appropriately designed and/or adjusted by non-linear optimization or an analytical synthesis approach to satisfy above-mentioned isolation and matching conditions.

Figure 2:
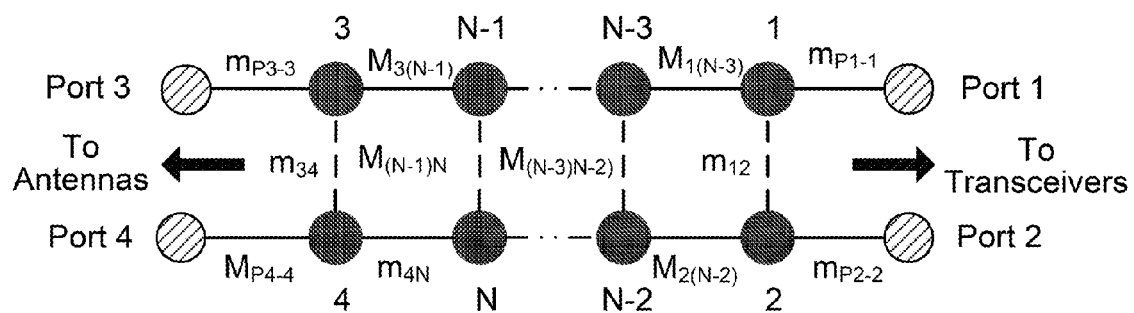
FIG. 2 is a routing diagram of a four-port N-order decoupling device according to an embodiment of the present application.

A routing diagram of the four-port N-order device according to the present application is shown in FIG. 2, where each solid circle represents a microwave resonator resonating at a designed frequency and the line marked by $m_{ij}$ represents for the required coupling between resonators i and j, and the solid line marked by $m_{pq-q}$ represents the coupling between port q (denoted herein as "pq") and resonator q. The couplings $m_{ij}$ and $m_{pq-q}$ are designed or adjusted appropriately so that desired isolation and matching conditions could be satisfied.

Hereinafter, specific embodiments of the present application will be described in an illustrative way. Note that features in such embodiments will not limit the invention in any extent.

Figure 3:
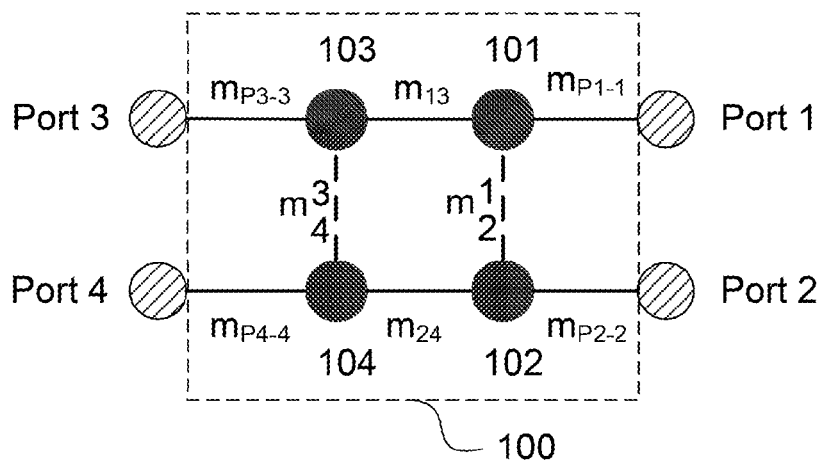
FIG. 3 is a routing diagram of a four-port device with four resonators according to an embodiment of the present application.

FIG. 3 depicts a routing diagram of a four-port device 100 with four resonators according to an embodiment of the present application. As shown, the four-port device 100 comprises four resonators 101, 102, 103 and 104. The resonator 101 is connected to a first port (port 1) of the device, which is configured to be connected to a first transceiver. The resonator 102 is connected to a second port (port 2) of the device, which is configured to be connected to a second transceiver. The resonator 103 is connected to a third port (port 3) of the device, which is configured to be connected to a first antenna for transmitting a signal from the first transceiver and/or receiving a signal to the first transceiver. The resonator 104 is connected to a fourth port (port 4) of the device, which is configured to be connected to a second antenna for transmitting a signal from the second transceiver and/or receiving a signal to the second transceiver. Each of the resonators 101, 102, 103 and 104 is coupled with at least one remaining of the four resonators. Meanwhile, each of the resonators 101, 102, 103 and 104 is coupled with each of the ports port 1, port 2, port 3 and port 4, respectively. At least some of the coupling coefficient m12 between resonator 101 and resonator 102, the coupling coefficient m34 between resonator 103 and resonator 104, the coupling coefficient m13 between resonator 101 and resonator 103, the coupling coefficient m24 between resonator 102 and resonator 104, the coupling coefficient mp1-1 between resonator 101 and port 1, the coupling coefficient mpg-2 between resonator 102 and port 2, the coupling coefficient mp3-3 between resonator 103 and port 3, and the coupling coefficient mp4-4 between resonator 104 and port 4, as well as the resonance frequencies of each resonator, are designed and/or adjusted so that desired isolation and matching conditions are to be satisfied. In addition, the coupling coefficient between resonator 101 and resonator 104 and/or the coupling coefficient between resonator 102 and resonator 103 may be further considered to satisfy the desired isolation and matching conditions.

Figure 4:
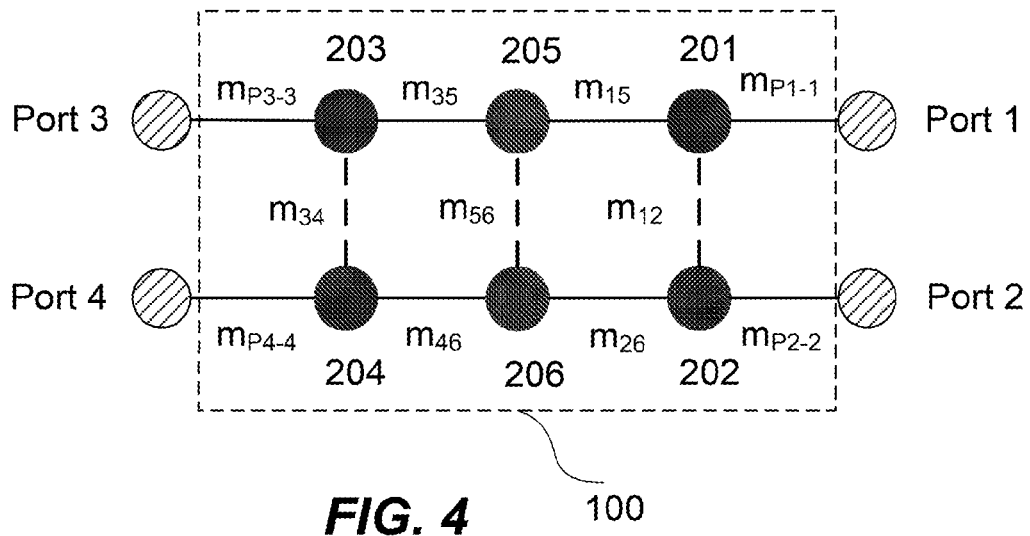
FIG. 4 is a routing diagram of a four-port device with six resonators according to an embodiment of the present application.

FIG. 4 depicts a routing diagram of a four-port device with six resonators according to an embodiment of the present application. As shown, the four-port device 100 comprises six resonators 201, 202, 203, 204, 205 and 206. The resonator 201 is connected to a first port (port 1) of the device, which is configured to be connected to a first transceiver. The resonator 202 is connected to a second port (port 2) of the device, which is configured to be connected to a second transceiver. The resonator 203 is connected to a third port (port 3) of the device, which is configured to be connected to a first antenna for transmitting a signal from the first transceiver and/or receiving a signal to the first transceiver. The resonator 204 is connected to a fourth port (port 4) of the device, which is configured to be connected to a second antenna for transmitting a signal from the second transceiver and/or receiving a signal to the second transceiver. The resonator 205 is located between and coupled with the resonators 201 and 203. The resonator 206 is located between and coupled with the resonators 202 and 204. Each of the resonators 201, 202, 203, 204, 205 and 206 is coupled with at least one remaining of the six resonators. Meanwhile, each of the resonators 201, 202, 203 and 204 is coupled with each of the ports port 1, port 2, port 3 and port 4, respectively. At least some of the coupling coefficient m12 between resonator 201 and resonator 202, the coupling coefficient m34 between resonator 203 and resonator 204, the coupling coefficient m56 between resonator 205 and resonator 206, the coupling coefficient m15 between resonator 201 and resonator 205, the coupling coefficient m35 between resonator 203 and resonator 205, the coupling coefficient m26 between resonator 202 and resonator 206, the coupling coefficient m46 between resonator 204 and resonator 206, the coupling coefficient mp1-1 between resonator 201 and port 1, the coupling coefficient mpg-2 between resonator 202 and port 2, the coupling coefficient mp3-3 between resonator 203 and port 3, and the coupling coefficient mp4-4 between resonator 204 and port 4, as well as the resonance frequencies of each resonator are designed and/or adjusted so that desired isolation and matching conditions are to be satisfied. In addition, the coupling coefficient between each two of the six resonators may be further considered to satisfy the desired isolation and matching conditions.

Figure 5:
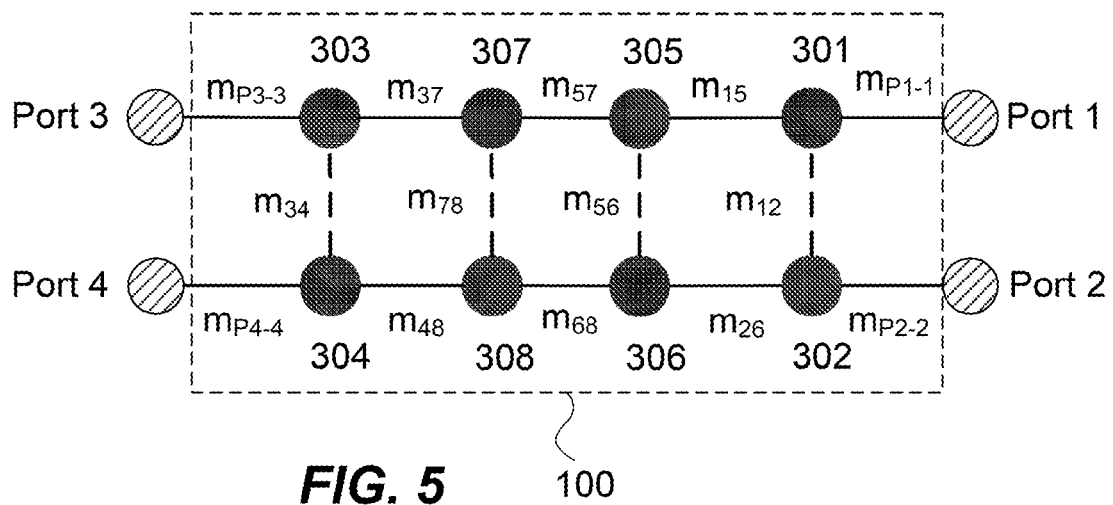
FIG. 5 is a routing diagram of a four-port device with eight resonators according to an embodiment of the present application.

FIG. 5 depicts a routing diagram of a four-port device with eight resonators according to an embodiment of the present application. As shown, the four-port device 100 comprises eight resonators 301, 302, 303, 304, 305, 306, 307 and 308. The resonator 301 is connected to a first port (port 1) of the device, which is configured to be connected to a first transceiver. The resonator 302 is connected to a second port (port 2) of the device, which is configured to be connected to a second transceiver. The resonator 303 is connected to a third port (port 3) of the device, which is configured to be connected to a first antenna for transmitting a signal from the first transceiver and/or receiving a signal to the first transceiver. The resonator 304 is connected to a fourth port (port 4) of the device, which is configured to be connected to a second antenna for transmitting a signal from the second transceiver and/or receiving a signal to the second transceiver. The resonators 305 and 307 are cascaded and located between the resonators 301 and 303. The resonators 306 and 308 are cascaded and located between the resonators 302 and 304. Each of the resonators 301, 302, 303, 304, 305, 306, 307 and 308 is coupled with at least one remaining of the eight resonators. Meanwhile, each of the resonators 301, 302, 303 and 304 is coupled with each of the ports port 1, port 2, port 3 and port 4, respectively. At least some of the coupling coefficient m12 between resonator 301 and resonator 302, the coupling coefficient m34 between resonator 303 and resonator 304, the coupling coefficient m56 between resonator 305 and resonator 306, the coupling coefficient m78 between resonator 307 and resonator 308, the coupling coefficient m15 between resonator 301 and resonator 305, the coupling coefficient m57 between resonator 305 and resonator 307, the coupling coefficient m37 between resonator 303 and resonator 307, the coupling coefficient m26 between resonator 302 and resonator 306, the coupling coefficient m68 between resonator 306 and resonator 308, the coupling coefficient m48 between resonator 304 and resonator 308, the coupling coefficient mp1-1 between resonator 301 and port 1, the coupling coefficient mpg-2 between resonator 302 and port 2, the coupling coefficient mp3-3 between resonator 303 and port 3, and the coupling coefficient mp4-4 between resonator 304 and port 4, as well as the resonance frequencies of each resonator are designed and/or adjusted so that desired isolation and matching conditions are to be satisfied. In addition, the coupling coefficient between each two of the eight resonators may be considered to satisfy the desired isolation and matching conditions.

Although four-port devices with four, six and eight resonators are described herein, they are only taken as examples for the purpose of explanation. A four-port device comprising N resonators (N is no less than four) with the above-mentioned features could be used to implement this invention.

According to a further embodiment of the present application, a decoupling device with more than four ports is proposed for decoupling more than two antennas.

Figure 6:
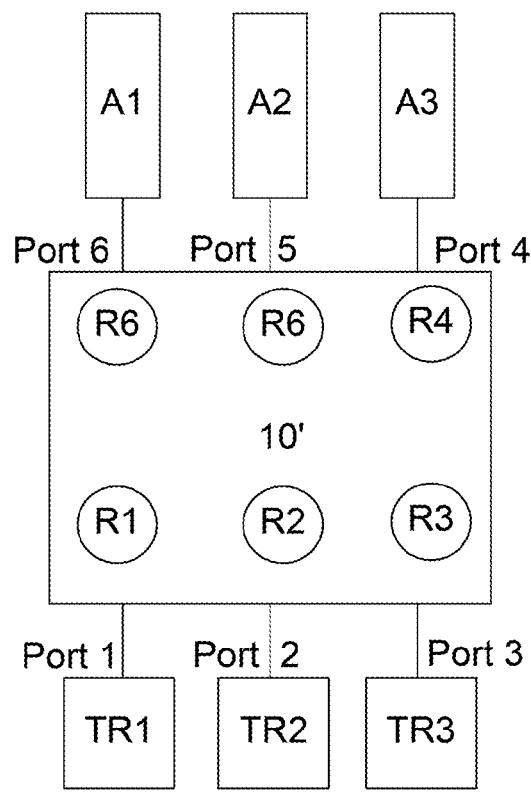
FIG. 6 is a block view of a system composed of three transceivers, three corresponding antennas, and a six-port decoupling device according to an embodiment of the present application.

FIG. 6 is a block view of a system composed of three transceivers, three corresponding antennas, and a six-port decoupling device according to an embodiment of the present application. As shown, three transceivers TR1, TR2 and TR3 are used for transmitting and receiving signals via antennas A1, A2 and A3 respectively. When the antennas A1, A2 and A3 (and also the transceivers TR1, TR2 and TR3) are closely positioned, the interference therebetween is large. To reduce such interference, a device 10' with six ports (port 1, port 2, port 3, port 4, port 5, port 6) accordingly is inserted between the antennas and the transceivers. The device 10' comprises at least six resonators R1, R2, R3, R4, R5 and R6 connected to port 1, port 2, port 3, port 4, port 5 and port 6, respectively. Each resonator of the at least six resonators is coupled with at least one remaining resonator of the at least six resonators, so that a resonator network is formed by the device 10'. According to the present application, a set of coupling coefficients between resonators in the resonator network are configured so that desired isolations between two closely positioned transceivers (port 1 and port 2, and port 2 and port 3) and matching conditions are satisfied. The coupling coefficients between resonators in the resonator network may be appropriately designed and/or adjusted by non-linear optimization or an analytical synthesis approach to satisfy desired isolations and matching conditions.

Figure 7:
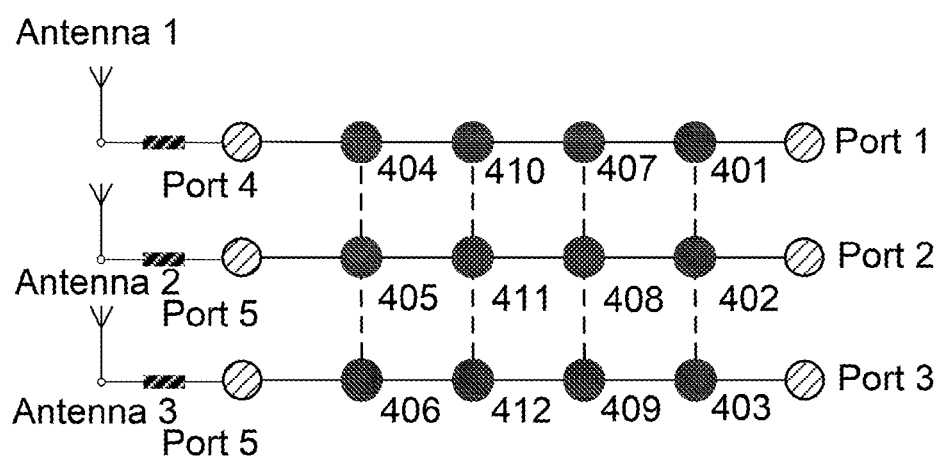
FIG. 7 is a routing diagram of a six-port device with twelve resonators according to an embodiment of the present application.

FIG. 7 depicts a routing diagram of a six-port device with twelve resonators according to an embodiment of the present application. As shown, the six-port device 400 comprises twelve resonators 401, 402, 403, 404, 405, 406, 407, 408, 409, 410, 411 and 412. The resonators 401, 402 and 403 are connected to a first port (port 1), a second port (port 2) and a third port (port 3) of the device, which are configured to be connected to a first transceiver, a second transceiver and a third transceiver, respectively. The resonator 404, 405 and 406 are connected to a fourth port (port 3), a fifth port (port 5), and a sixth port (port 6) of the device, which are configured to be connected to antennas for transmitting a signal from and/or receiving a signal to the first transceiver, the second transceiver, and a third transceiver, respectively. The resonators 407 and 410 are cascaded and located between the resonators 401 and 404. The resonators 408 and 411 are cascaded and located between the resonators 402 and 405. The resonators 409 and 412 are cascaded located between the resonators 403 and 405. Each of the resonators 401, 402, 403, 404, 405, 406, 407, 408, 409, 410, 411 and 412 is coupled with at least one remaining of the twelve resonators. Meanwhile, each of the resonators 401, 402, 403, 404, 405 and 406 is coupled with each of port 1, port 2, port 3, port 4, port 5 and port 6, respectively. At least some of the coupling coefficients between each two of the twelve resonators are designed and/or adjusted so that desired isolation and matching conditions are satisfied.

According to the present application, the antennas may work at the same or different frequencies. As long as coupling coefficients between resonators are appropriately adjusted, desired isolation and matching conditions can be satisfied.

Hereinafter, two practical design examples will be presented in an illustrative way to prove the concept of the invention. In both examples, two high gain (with peak gain around 7.6 dBi) sleeve dipole antennas, one of which operates at 2.35 GHz and the other of which operates at 2.45 GHz, are prepared as the testing vehicle. Such high gain antennas are used to imitate the characteristic of two high gain base station antennas operating in adjacent bands. The 2.35 GHz antenna is assumed to serve a TD-LTE radio system, while the 2.45 GHz antenna is targeted to serve a Wi-Fi system. Such situation reflects a popular scenario for 4G femto cells where a Wi-Fi router works in a close proximity of a TD-LTE wireless system. Since the TD-LTE band 2300~2400 (MHz) is immediately adjacent to the ISM band 2400~2483.5 (MHz), even if the antennas are placed 420 mm (3.36$\lambda_g$ at 2400 MHz) apart, less than 25 dB isolation is observed. For a typical TD-LTE femto cell, whose transmitting power is around 20~23 dBm, the unwanted power that is coupled to its neighbor Wi-Fi system can be far above the receiver sensitivity level that is around −90~−70 dBm, even with a 60~80 dB filter rejection.

Moreover, for TD-LTE and Wi-Fi systems, the frequency bands are contiguous, the isolation between them near the adjacent band edge are most difficult to deal with using a conventional means. To demonstrate the decoupling device in solving the coexistence problem between two radio systems, two decoupling devices are designed, fabricated and measured as examples. Each design process starts with the design of the coupled resonator circuit model. Having had the circuit model designed, a decoupling device is realized using coaxial combine resonators, which is similar to conventional filter realization, except that the decoupling device is a four-port rather than a two-port device. Additionally, the design of the decoupling device strongly depends on the S-parameters of the coupled antennas. In both design examples, the outer and inner diameters, and the height of the coaxial combine resonator are chosen to be 20.0 mm, 10.0 mm and 25.0 mm respectively. The diameter of all the tuning screws is 3.0 mm. The detailed design procedure and the performance comparison are given in the following description.

Figure 8:
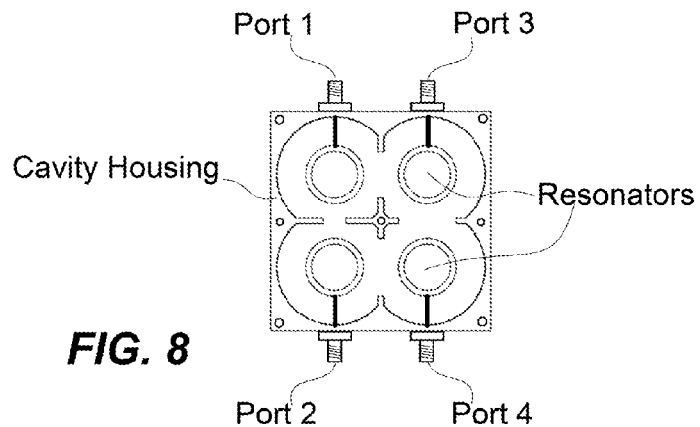
FIG. 8 is a prototype of a 4-th order decoupling device according to an embodiment of the present application.
Figure 9:
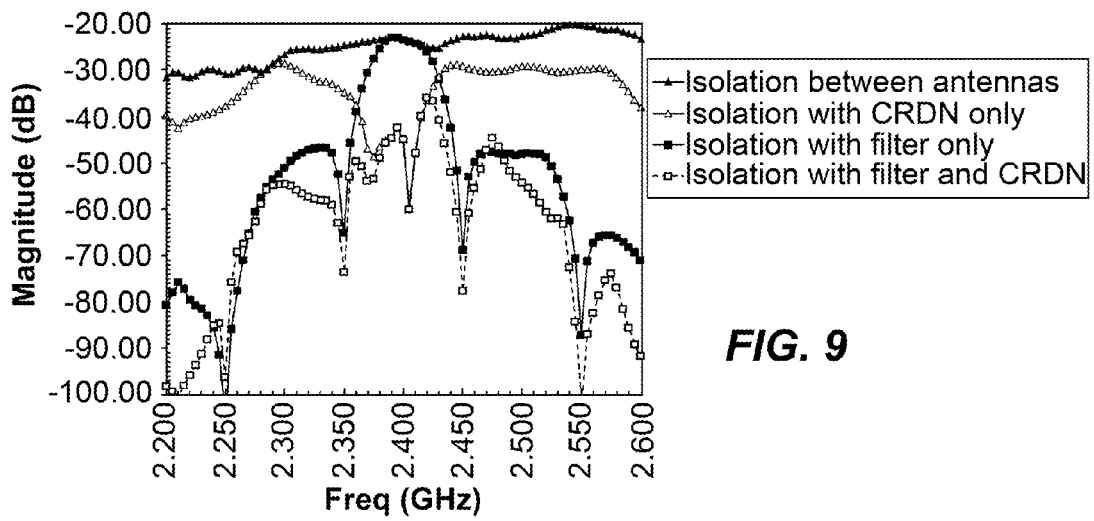
FIG. 9 is a diagram showing measured isolations of a system with and without the device as shown in FIG. 8.

The first example is to optimize and design a 4-th order decoupling device (i.e., a device with four resonators) to improve the isolation between the two sleeve dipole antennas. A prototype of the 4-th order decoupling device is shown in FIG. 8. As shown, four resonators are positioned in a housing forming a cavity. The housing also forms separators between each two of the resonators. The coupling coefficients between resonators may be adjusted by setting widths of gaps in the separators. The isolation between the two antennas is not more than 25 dB within the frequency bands without a decoupling network. To be convenient, the circuit model in FIG. 3 is utilized for a 4-th order decoupling device. The circuit model described by coupling coefficients is cascaded with the S-parameters measured at the two antenna ports at ports 3 and 4, and is optimized to achieve an optimal isolation while achieving a good impedance matching at ports 1 and 2. The optimum coupling coefficients can be easily obtained. The physical model is EM simulated and designed using an EM simulation tool. The prototype decoupling device is then fabricated according to the EM designed model and is tuned according to the designed circuit model. After the prototype decoupling device is well tuned, it is cascaded to the two antennas in the testing vehicle. The measured isolations of the two-port cascaded system are shown in FIG. 9. It can be seen that the best improvement in isolation is about 20 dB near 2.4 GHz. To investigate the performance of the decoupling device in practical radio systems, two simulated pre-selection channel filters working at the TD-LTE and the ISM bands respectively are also cascaded to the systems at port 1 and port 2. Both circuit model simulated filters are fourth-order with a return loss level of 22 dB. The filter for TD-LTE has designed to have a transmission zero at 2.45 GHz while the filter for Wi-Fi has its transmission zero at 2.35 GHz. The S-parameters of the two decoupled channels including channel filters with and without the 4-th order decoupling device are also superposed in FIGS. 9 and 10. Despite the fact that the 4-th order decoupling device can significantly enhance the isolation between the two radio systems in adjacent bands, the return losses are not well matched. As can be seen from FIG. 10, the two antennas together with their respective channel filters can achieve the return loss of 15 dB within their respective working frequency bands. However, when they are cascaded with the designed decoupling device, the return losses degrade to certain extent. To achieve a better port impedance matching after cascading a decoupling device, the filter circuit model needs to be redesigned to match the complex load looking into the decoupling device. A higher order decoupling device is investigated in next design example.

Figure 10:
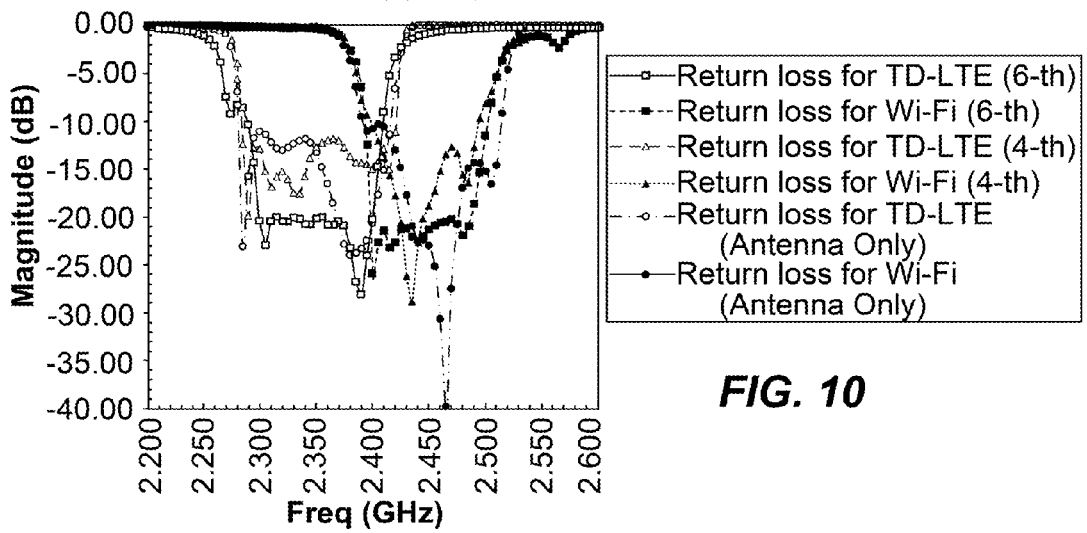
FIG. 10 is a diagram showing measured return losses of a system with and without the devices as shown in FIGS. 8 and 11.
Figure 11:
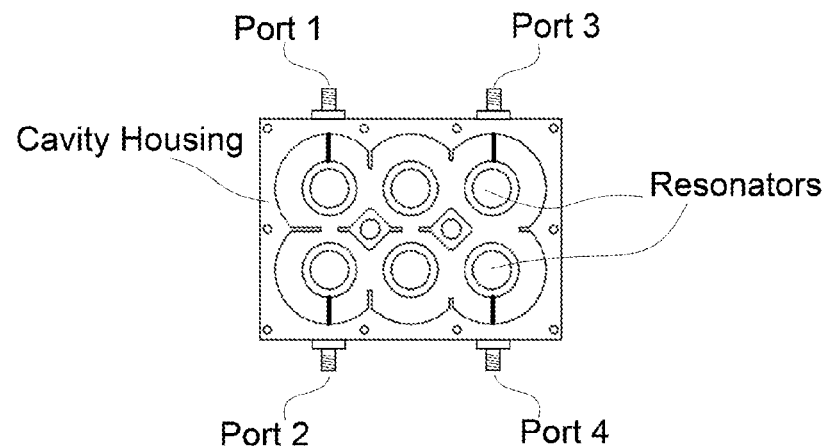
FIG. 11 is prototype of a 6-th order decoupling device according to an embodiment of the present application.
Figure 12:
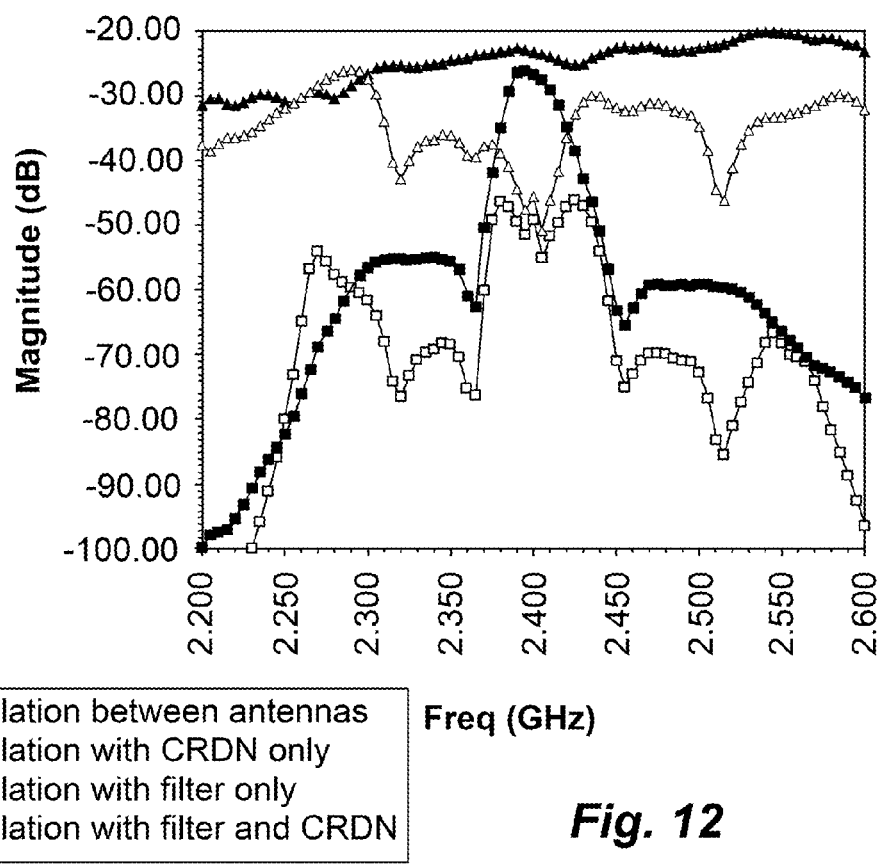
FIG. 12 is a diagram showing measured isolations of a system with and without the device as shown in FIG. 11.

To improve the isolation between the two systems while maintaining a good port impedance matching performance, a 6-th order decoupling device is considered in this example. The design procedure is similar to that of the 4-th order decoupling device. The circuit model in FIG. 4 is used and the optimum coupling coefficients are obtained by optimizing the circuit model. A prototype 6-th order decoupling device using coaxial combine cavity resonators is EM designed and fabricated with its EM model shown in FIG. 11. Then the decoupling device is cascaded to the two antennas in the testing vehicle. The overall performances of the two collocated Wi-Fi and TD-LTE radio systems with and without cascading the 6-th order decoupling device are given in FIG. 12. It is obvious that the 6-th order decoupling device can provide an improvement of more than 25 dB in antenna-to-antenna isolation near 2.4 GHz. In practice, a band pass filter in each of the transceiver chains will be used. Therefore, the system performance with simulated realistic filters is also considered and is shown in FIG. 12. With two 4-th order chebyshev filters (same as that in the example of the 4-th order decoupling device) in both TD-LTE and Wi-Fi channels, the proposed 6-th order decoupling device can provide more than 25 dB near the adjacent band edge and an more than 10 dB improvements in rest of the two bands in isolation as compared to the case where only channel filters are applied. More importantly, the return losses for both channels are also improved. By adjusting the parameters in the filter circuit model accordingly, in the TD-LTE and the Wi-Fi bands, the return losses can meet 20-dB specification as shown in FIG. 10, which is a significant improvement as compared to the return losses of the original antennas.

Although a specific resonator form is used in the described examples, other forms of resonators are also possible. The skilled in the art may implement the resonators and design/adjust/tune the coupling coefficient between resonators in any suitable way.

According to a further embodiment, the decoupling device may be used in an application in which a plurality of antennas are implemented as a single antenna for transmitting signals from and receiving signals to a plurality of transceivers respectively. In such applications, a port combining module is further included. For example, by combining the two ports that are connected to two separate antennas, the four port decoupling device thus forms a three-port microwave combiner or diplexer. The three port decoupling device consists of a first port connected to a first transceiver, a second port connected to a second transceiver and the third port connected to either one common antenna or other signal processing device for transmitting a signal from and receiving a signal to both transceivers. The port combining module can be realized by a resonator or a T-junction. Properly setting the parameter of the combining module, the couplings between the at least four resonators, the resonant frequency of each resonator in said four port decoupling device, in addition to the desired matching at all three ports and the isolation between the first and the second port, appropriate filtering characteristics between the first port and the port connected to the single antenna (new port 3) and the filter characteristics between the second port and the new port 3 can be obtained.

Figure 13:
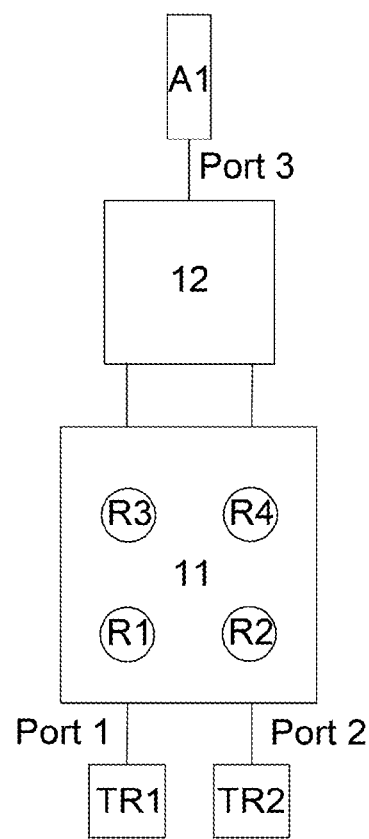
FIG. 13 is block view of a system composed of two transceivers, only one antenna, and a decoupling device according to an embodiment of the present application, in which a port combining module is included.

In FIG. 13, the four port device in FIG. 1 is connected to a three port combining module 12. As shown, two transceivers TR1 and TR2 working in adjacent frequency bands are used for transmitting and receiving signals via one common antenna A1. The device 11 consists of four ports accordingly and comprises at least four resonators R1, R2, R3 and R4. Each resonator of the at least four resonators is coupled with at least one remaining resonator of the at least four resonators, so that a resonator network is formed by the device 11. According to the present application, the parameters of the combining module 12 as well as the coupling coefficients between and the resonant frequency of the said at least four resonators are configured such that the matching conditions for port 1, port 2 and port 3 and the isolation condition between port 1 and port 2 in FIG. 13, and appropriate filtering characteristics between port 1 and port 3 and between port 2 and port 3 of the three-port device are satisfied simultaneously.

Figure 14:
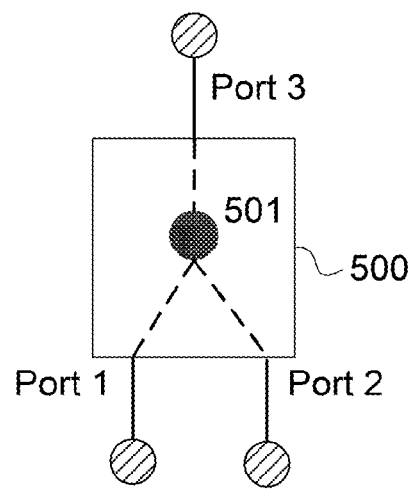
FIG. 14 is a possible realization of the port combining module as shown in FIG. 13.

FIG. 14 depicts one possible implementation of the combining module 500. The node 501 represents a non-resonant node and can also be realized by a resonator with properly configured resonant frequency. The dashed lines represent coupling coefficients that are to be adjusted. Port 1 and Port 2 of device 500 in FIG. 14 is connected to Port 3 and Port 4 of the decoupling device depicted in FIG. 1.

Figure 15:
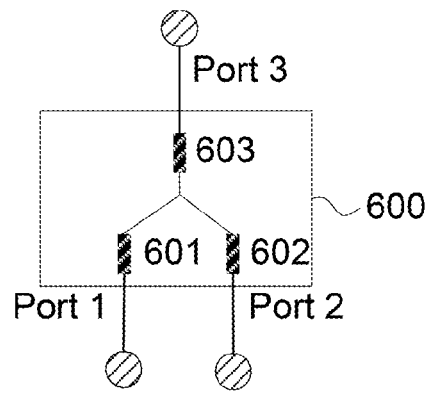
FIG. 15 is another possible realization of the port combining module as shown in FIG. 13.

FIG. 15 depicts another possible implementation of the combining module 600. The characteristic impedance the electrical length of the three transmission lines 601, 602 and 603 are to be adjusted. Port 1 and Port 2 of device 600 in FIG. 15 is connected to Port 3 and Port 4 of the decoupling device depicted in FIG. 1.

Figure 16:
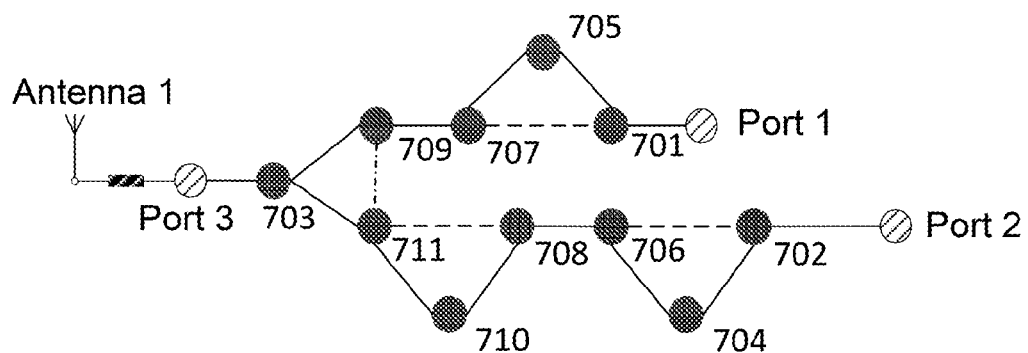
FIG. 16 is a routing diagram of the decoupling device of FIG. 13 with eleven resonators as an illustrative example.

FIG. 16 depicts an illustrative routing diagram of a three port microwave combiner or diplexer with superior isolation characteristic. The example is with eleven resonators according to an embodiment of the present application. Port 1 and Port 2 in FIG. 16 are directly connected to two transceivers separately. Port 3 is directly connected to Antenna 1. The resonant frequencies of Resonators 701 through 711 are properly set. Meanwhile, the solid lines which representing main line couplings, the dashed lines which represent cross coupling and the dash-dot lines which representing inter-channel couplings are also configured such that port 1 port 2 and port 3 are matched at desired frequency bands, isolation condition between port 1 and port 2, and appropriate filtering characteristics between port 1 and port 3 and between port 2 and port 3 of the three-port device are satisfied.

Although a four-port decoupling device, a six-port device and a three-port device are described, it is understood that the decoupling device may also have other numbers of ports. As long as parameters in the device are well set, desired isolation and matching can be obtained.

According to an aspect of the application, a method for reducing interference between antennas in a compact antenna array is proposed. According to an embodiment, the antenna array comprises a plurality of antennas for transmitting signals from and receiving signals to a plurality of transceivers respectively, and the method comprises forming a resonator network comprising a plurality of resonators, a first set of ports each of which is connected to a respective one of the plurality of transceivers, and a second set of ports each of which is connected to a respective one of the plurality of antennas, so that each of the transceivers and the antennas is connected to a respective one of the resonators; and setting coupling coefficients among the resonators as well as a resonance frequency of each of the resonators so that a desired isolation among the first set of ports and a desired matching at each of the first set of ports are obtained.

In an embodiment, the antenna array comprises a first antenna and a second antenna for transmitting signals from and receiving signals to a first transceiver and a second transceiver respectively, the first set of ports comprise a first port connected to the first transceiver and a second port connected to the second transceiver, the second set of ports comprise a third port connected to the first antenna and a fourth port connected to the second antenna, and the plurality of resonators comprise at least four resonators including a first resonator connected to the first port, a second resonator connected to the second port, a third resonator connected to the third port, and a fourth resonator connected to the fourth port, each of the at least four resonators is coupled with at least one remaining resonator of the at least four resonators, and the setting step comprises setting coupling coefficients between the at least four resonators as well as a resonance frequency of each of the at least four resonators so that a desired isolation between the first port and the second port and a desired matching of each of the first port and the second port are obtained.

In an embodiment, the antenna array comprises a first antenna, a second antenna and a third antenna for transmitting signals from and receiving signals to a first transceiver, a second transceiver and a third transceiver respectively, the first set of ports comprise a first port connected to the first transceiver, a second port connected to the second transceiver, and a third port connected to the third transceiver, the second set of ports comprise a fourth port connected to the first antenna, a fifth port connected to the second antenna, and a sixth port connected to the third antenna, and the plurality of resonators comprise at least six resonators including a first resonator connected to the first port, a second resonator connected to the second port, a third resonator connected to the third port, a fourth resonator connected to the fourth port, a fifth resonator connected to the fifth port, and a sixth resonator connected to the sixth port, each of the at least six resonators is coupled with at least one remaining resonator of the at least six resonators, and the setting step comprises setting coupling coefficients among the at least six resonators as well as a resonance frequency of each of the at least six resonators so that a desired isolation between the first port and the second port and a desired isolation between the second port and the third port and a desired matching at each of the first port, the second port and the third port are obtained.

In an embodiment, the plurality of antennas are implemented as a single antenna for transmitting signals from and receiving signals to a plurality of transceivers respectively, the method further comprises inserting a port combining module between the single antenna and the second sets of ports, wherein the port combining unit having a first port connected to the single antenna and a plurality of ports each connected to a respective one of the second sets of ports; wherein the setting step comprises setting coupling coefficients among the resonators, a resonance frequency of each of the resonators, and parameters of the port combining module so that a desired isolation among the first set of ports and a desired matching at each of the first set of ports are obtained.

In an embodiment, the port combining module is implemented by a non-resonate node or a T-junction.

While embodiments of the present application are described herein, it is understood that the embodiments described herein are illustrative, but not limited. Technical features disclosed in various embodiments can be modified in appropriate ways. Various modifications and variations of the described embodiments can be made within the scope and spirit of the present application.

What is claimed is:

1. A device for reducing interference between antennas in a compact antenna array, the antenna array comprising a plurality of antennas for transmitting signals from and receiving signals to a plurality of transceivers respectively, the device comprising:
   a plurality of resonators;
   a first set of ports, each of which is connected to a respective one of the plurality of transceivers; and
   a second set of ports, each of which is connected to a respective one of the plurality of antennas;
   wherein at least two of the plurality resonators are cascade connected between each of the first set of ports and a corresponding one of the second set of ports;
   wherein each of the transceivers and the antennas is connected to a respective one of the resonators, and coupling coefficients among the resonators as well as a resonance frequency of each of the resonators are configured so that a desired isolation among the first set of ports and a desired matching performance at each of the first set of ports are obtained.

2. A device according to claim 1, wherein the antenna array comprises a first antenna and a second antenna for transmitting signals from and receiving signals to a first transceiver and a second transceiver respectively, the first set of ports comprise a first port connected to the first transceiver and a second port connected to the second transceiver, the second set of ports comprise a third port connected to the first antenna and a fourth port connected to the second antenna, and the plurality of resonators comprise at least four resonators including a first resonator connected to the first port, a second resonator connected to the second port, a third resonator connected to the third port, and a fourth resonator connected to the fourth port, each of the at least four resonators is coupled with at least one remaining resonator of the at least four resonators, and wherein coupling coefficients between the at least four resonators as well as the resonance frequency of each of the at least four resonators are configured so that a desired isolation between the first port and the second port and a desired matching performance of each of the first port and the second port are obtained.

3. A device according to claim 2, wherein said at least four resonators are the first resonator, the second resonator, the third resonator and the fourth resonator, and the coupling coefficients between each pair of adjacently coupled resonators, the coupling coefficients between each antenna to its correspondingly connected resonator as well as the resonance frequency of each of the at least four resonators are configured so that the desired isolation and matching performance are obtained.

4. A device according to claim 2, wherein said at least four resonators are the first resonator, the second resonator, the third resonator, the fourth resonator, a fifth resonator located between and coupled with the first resonator and the third resonator, and a sixth resonator located between and coupled with the second resonator and the fourth resonator, and wherein the coupling coefficients between each pair of adjacently coupled resonators, the coupling coefficients between each antenna to its correspondingly connected resonator as well as the resonance frequency of each of the at least six resonators are configured so that the desired isolation and the desired matching performance are obtained.

5. A device according to claim 1, wherein the antenna array comprises a first antenna, a second antenna and a third antenna for transmitting signals from and receiving signals to a first transceiver, a second transceiver and a third transceiver respectively, the first set of ports comprise a first port connected to the first transceiver, a second port connected to the second transceiver, and a third port connected to the third transceiver, the second set of ports comprise a fourth port connected to the first antenna, a fifth port connected to the second antenna, and a sixth port connected to the third antenna, and the plurality of resonators comprise at least six resonators including a first resonator connected to the first port, a second resonator connected to the second port, a third resonator connected to the third port, a fourth resonator connected to the fourth port, a fifth resonator connected to the fifth port, and a sixth resonator connected to the sixth port, each of the at least six resonators is coupled with at least one remaining resonator of the at least six resonators, wherein coupling coefficients among the at least six resonators as well as the resonance frequency of each of the at least six resonators are configured so that a desired isolation between the first port and the second port and a desired isolation between the second port and the third port and a desired matching performance at each of the first port, the second port and the third port are obtained.

6. A method for reducing interference between antennas in a compact antenna array, the antenna array comprising a plurality of antennas for transmitting signals from and receiving signals to a plurality of transceivers respectively, the method comprising:
   forming a coupled resonator network comprising a plurality of resonators, a first set of ports each of which is connected to a respective one of the plurality of transceivers, and a second set of ports each of which is connected to a respective one of the plurality of antennas, so that each of the transceivers and the antennas is connected to a respective one of the resonators and at least two of the plurality resonators are cascade connected between each of the first set of ports and a corresponding one of the second set of ports; and
   setting coupling coefficients among adjacently coupled resonators as well as a resonance frequency of each of the resonators so that a desired isolation among the first set of ports and a desired matching performance at each of the first set of ports are obtained.

7. A method according to claim 6, wherein the antenna array comprises a first antenna and a second antenna for transmitting signals from and receiving signals to a first transceiver and a second transceiver respectively, the first set of ports comprise a first port connected to the first transceiver and a second port connected to the second transceiver, the second set of ports comprise a third port connected to the first antenna and a fourth port connected to the second antenna, and the plurality of resonators comprise at least four resonators including a first resonator connected to the first port, a second resonator connected to the second port, a third resonator connected to the third port, and a fourth resonator connected to the fourth port, each of the at least four resonators is coupled with at least one remaining adjacent resonator of the at least four resonators, and wherein the setting step comprises setting coupling coefficients between the at least four resonators as well as the resonance frequency of each of the at least four resonators so that a desired isolation between the first port and the second port and a desired matching performance of each of the first port and the second port are obtained.

8. A method according to claim 6, wherein the antenna array comprises a first antenna, a second antenna and a third antenna for transmitting signals from and receiving signals to a first transceiver, a second transceiver and a third transceiver respectively, the first set of ports comprise a first port connected to the first transceiver, a second port connected to the second transceiver, and a third port connected to the third transceiver, the second set of ports comprise a fourth port connected to the first antenna, a fifth port connected to the second antenna, and a sixth port connected to the third antenna, and the plurality of resonators comprise at least six resonators including a first resonator connected to the first port, a second resonator connected to the second port, a third resonator connected to the third port, a fourth resonator connected to the fourth port, a fifth resonator connected to the fifth port, and a sixth resonator connected to the sixth port, each of the at least six resonators is coupled with at least one remaining adjacent resonator of the at least six resonators, and wherein the setting step comprises setting coupling coefficients among the at least six resonators as well as the resonance frequency of each of the at least six resonators so that a desired isolation between each pair of the ports and a desired matching performance at each of the ports are obtained.

\* \* \* \* \*